(12) United States Patent
Hall et al.

(10) Patent No.: US 8,757,870 B2
(45) Date of Patent: Jun. 24, 2014

(54) LOCATION DEPENDENT CALIBRATION FOR DISTRIBUTED TEMPERATURE SENSOR MEASUREMENTS

(75) Inventors: Travis S. Hall, Blacksburg, VA (US); Brooks A. Childers, Christiansburg, VA (US)

(73) Assignee: Baker Hughes Incorporated, Houston, TX (US)

(*) Notice: Subject to any disclaimer, the term of this patent is extended or adjusted under 35 U.S.C. 154(b) by 865 days.

(21) Appl. No.: 12/051,984

(22) Filed: Mar. 20, 2008

(65) Prior Publication Data

US 2008/0232425 A1 Sep. 25, 2008

Related U.S. Application Data

(60) Provisional application No. 60/896,327, filed on Mar. 22, 2007.

(51) Int. Cl.
*G01K 15/00* (2006.01)
*G01K 3/06* (2006.01)
*G01J 5/08* (2006.01)

(52) U.S. Cl.
USPC ............ 374/1; 374/131; 374/110; 374/161; 374/137; 374/2; 356/43

(58) Field of Classification Search
USPC ............... 374/1–2, 100, 112, 115, 161, 159, 374/136–137, 120–121, 124, 130–131, 53; 356/43, 51; 73/152, 33; 324/104; 385/12, 13, 100, 102, 113, 109, 116
See application file for complete search history.

(56) References Cited

U.S. PATENT DOCUMENTS

| | | | | |
|---|---|---|---|---|
| 3,467,189 A | * | 9/1969 | Dingley | 166/250.15 |
| 4,111,048 A | * | 9/1978 | Zuckerman et al. | 374/109 |
| 4,242,907 A | * | 1/1981 | Kazmierowicz | 374/113 |
| 4,440,509 A | * | 4/1984 | Agarwal | 374/166 |
| 5,696,863 A | * | 12/1997 | Kleinerman | 385/123 |
| 5,721,615 A | * | 2/1998 | McBride et al. | 356/477 |
| 5,821,861 A | * | 10/1998 | Hartog et al. | 340/584 |
| 5,857,777 A | | 1/1999 | Schuh | |
| 6,009,216 A | * | 12/1999 | Pruett et al. | 385/12 |
| 6,442,304 B1 | | 8/2002 | Crawley et al. | |
| 6,507,007 B2 | * | 1/2003 | Van Bilsen | 219/497 |

(Continued)

FOREIGN PATENT DOCUMENTS

JP 07270256 A * 10/1995

OTHER PUBLICATIONS

Lee, et al. "The Implementation of Self Calibration Techniques in Raman Backscatter Based Fiber Optic Distributed Temperature System (DTS) Technology". IEE PES Transmission and Distribution Conference and Exposition. Chicago, USA, Apr. 21-24, 2008.

*Primary Examiner* — Gail Verbitsky
(74) *Attorney, Agent, or Firm* — Cantor Colburn LLP

(57) ABSTRACT

A method for calibrating distributed temperature sensing (DTS) systems is disclosed. The method includes: receiving temperature data associated with one or more locations along a length of an optical fiber; calculating a set of unique calibration coefficients specific to each of the one or more locations along the fiber length; and applying the set of calibration coefficients specific to each of the one or more locations along the fiber length to the temperature data for calibrated correction thereof. Also disclosed is a system for calibrating DTS data and a wellbore for providing calibrated DTS data.

19 Claims, 4 Drawing Sheets

(56) References Cited

U.S. PATENT DOCUMENTS

| | | | |
|---|---|---|---|
| 6,807,324 B2* | 10/2004 | Pruett | 385/12 |
| 7,126,680 B2* | 10/2006 | Yamate et al. | 356/73.1 |
| 7,215,416 B2* | 5/2007 | Yamate et al. | 356/73.1 |
| 7,279,659 B2* | 10/2007 | Gagas et al. | 219/400 |
| 7,379,631 B2* | 5/2008 | Poland et al. | 385/12 |
| 7,529,434 B2* | 5/2009 | Taverner et al. | 385/12 |
| 7,539,361 B2* | 5/2009 | Dimmick et al. | 385/12 |
| 7,561,771 B2* | 7/2009 | Jaaskelainen et al. | 385/100 |
| 7,628,531 B2* | 12/2009 | Lee et al. | 374/1 |
| 7,628,533 B2* | 12/2009 | Lee et al. | 374/7 |
| 7,769,252 B2* | 8/2010 | Taverner et al. | 385/12 |
| 7,855,608 B2* | 12/2010 | Babitch | 331/66 |
| 8,016,757 B2* | 9/2011 | Kaczkowski et al. | 600/438 |
| 2005/0140966 A1* | 6/2005 | Yamate et al. | 356/73.1 |
| 2006/0115204 A1* | 6/2006 | Marsh et al. | 385/12 |
| 2006/0146321 A1* | 7/2006 | Sezginer et al. | 356/241.1 |
| 2006/0239330 A1* | 10/2006 | Yamate et al. | 374/161 |
| 2007/0009007 A1* | 1/2007 | Nicholls et al. | 374/10 |
| 2007/0223556 A1* | 9/2007 | Lee et al. | 374/1 |
| 2008/0084913 A1* | 4/2008 | Perales et al. | 374/131 |
| 2009/0033331 A1* | 2/2009 | Stoesz | 324/323 |
| 2010/0086257 A1* | 4/2010 | Ringgenberg et al. | 385/59 |
| 2010/0254650 A1* | 10/2010 | Rambow | 385/13 |
| 2012/0143522 A1* | 6/2012 | Chen et al. | 702/42 |
| 2012/0147920 A1* | 6/2012 | Glombitza | 374/102 |
| 2012/0147924 A1* | 6/2012 | Hall | 374/161 |
| 2012/0170898 A1* | 7/2012 | Ringgenberg et al. | 385/96 |
| 2012/0174378 A1* | 7/2012 | Ringgenberg et al. | 29/428 |

* cited by examiner

LOCATION DEPENDENT CALIBRATION FOR DISTRIBUTED TEMPERATURE SENSOR MEASUREMENTS

CROSS REFERENCE TO RELATED APPLICATIONS

The present application claims the benefit of U.S. Provisional Patent Application No. 60/896,327 filed on Mar. 22, 2007, the entire contents of which are specifically incorporated herein by reference in its entirety.

BACKGROUND

A common problem with distributed temperature sensing systems (DTS) involves difficulties in making calibrated temperature measurements. Calibrations have very limited benefit if the spectral dependent loss is non-linear (location dependent). In the case of non-linear spectral attenuation, one accepted solution is to deploy a DTS sensing fiber in a dual-ended configuration, which, when interrogated from both directions by a DTS system on the surface, can be used to correct for errors due to non-linear spectral attenuation. To date, a primary technique to achieve a dual-ended DTS configuration has been to use control line tubing (which may be, e.g., around ¼ inch in outer diameter) and a U-tube at the distal end of the system that connects the tubing, and then to pump an optical fiber along the entire length of the tubing (in the case of downhole applications, from the surface to bottom hole and back to the surface).

Prior art procedures for calibrating DTS data include averaging entire sections of temperature data along a fiber's length. Due to various inconsistencies in the temperature data generated from these procedures, such procedures are often unreliable. Unreliability often comes in the form of temperature value spikes and other inconsistencies at various locations along the fiber's length, which is apparent with reference to PRIOR ART FIG. 1. This Figure illustrates a temperature data display 10 showing temperature data calibrated using current procedures. As is demonstrated in FIG. 1, such current DTS calibration procedures result in significant inaccuracies in temperature data, such as spikes at various locations along the fiber's length and/or sections of temperature data forming slopes or gradients along sections of the fiber's length.

SUMMARY

A method for calibrating distributed temperature sensing (DTS) systems includes: receiving temperature data associated with one or more locations along a length of an optical fiber; calculating a set of unique calibration coefficients specific to each of the one or more locations along the fiber length; and applying the set of calibration coefficients specific to each of the one or more locations along the fiber length to the temperature data for calibrated correction thereof.

A system for calibrating DTS data includes: an optical fiber having one or more sensing locations along a fiber length; and a DTS unit for receiving temperature data associated with one or more locations along a length of the optical fiber. The DTS unit includes: a receiver for receiving temperature dependent signals and generating the temperature data therefrom; and a processor for calculating a set of unique calibration coefficients specific to each of the one or more locations along the fiber length, and applying the set of calibration coefficients specific to the one or more locations along the fiber length to the temperature data for calibrated correction thereof.

A wellbore for providing calibrated DTS data includes: an optical fiber having one or more sensing locations along a fiber length; and a DTS unit for receiving temperature data associated with one or more locations along a length of the optical fiber. The DTS unit includes: a receiver for receiving temperature dependent signals and generating the temperature data therefrom; and a processor for calculating a set of unique calibration coefficients specific to each of the one or more locations along the fiber length, and applying the set of calibration coefficients specific to the one or more locations along the fiber length to the temperature data for calibrated correction thereof.

BRIEF DESCRIPTION OF THE DRAWINGS

Referring now to the drawings, wherein like elements are numbered alike in the several FIGURES.

PRIOR ART

DETAILED DESCRIPTION OF EXEMPLARY EMBODIMENTS

Reference will now be made in detail to exemplary embodiments, examples of which are illustrated in the accompanying drawings.

Figure 1:
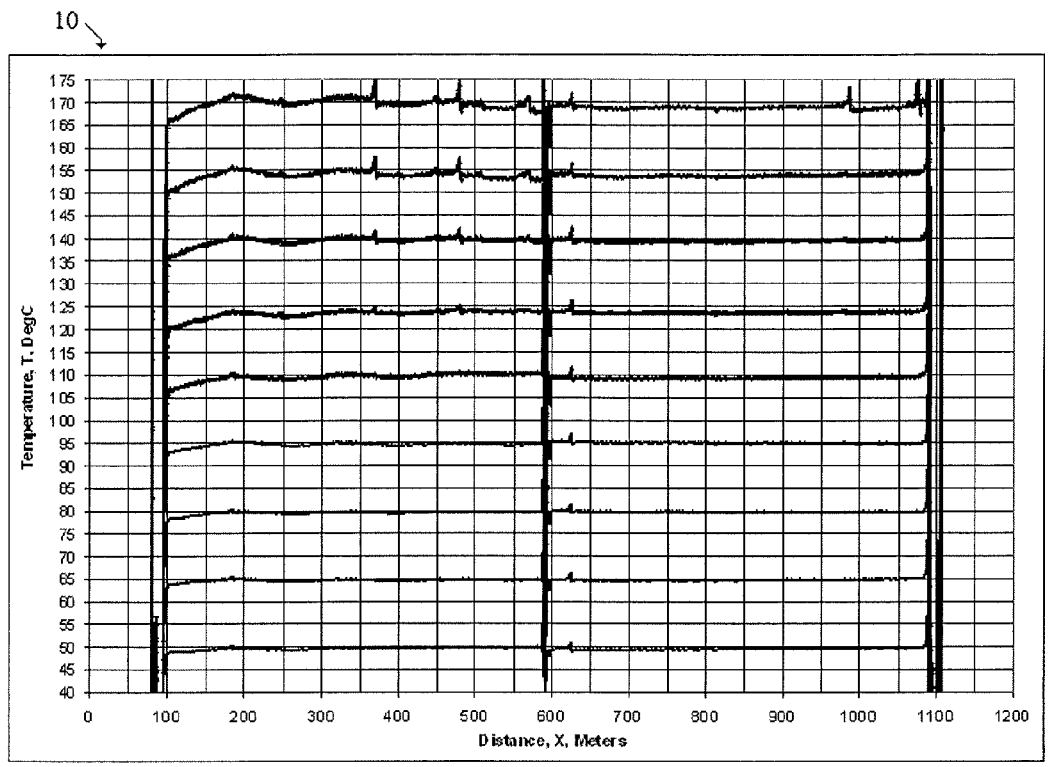
FIG. 1 is a graph of calibrated DTS data using prior art calibration methods.

Referring now to FIG. 1, an exemplary distributed temperature sensing (DTS) test configuration is illustrated generally at 20. The exemplary DTS test configuration 20 includes a DTS unit 22 having a channel 1, designated as 24, and a channel 2, designated as 26. A dual ended optical fiber 28 is, in one embodiment, connected at one end to channel 1 and at the other end to channel 2. One or more insulated stability chambers 30, 32 are provided at selected locations along the fiber 28.

The DTS unit 22 may be any suitable device for receiving and/or processing temperature dependent electromagnetic signals. In one example, the DTS unit 22 includes at least one of a radiation source such as a pulsed laser, a directional coupler for coupling a signal to a receiver 23 for generating temperature data from the signals, and a processor 25 for processing a received signal and determining a temperature value based on the received signal. In another embodiment, the DTS unit 22 is a SensorTran DTS unit.

In the present embodiment, the fiber 28 is a dual ended fiber, and is connected to the two channels 1 and 2 at each end. However, in other embodiments, the fiber 28 is a single ended fiber, or a dual ended fiber having a single end connected to the DTS unit 22. Also in the present embodiment, the temperature data acquired from the fiber 28 is single ended temperature data. In other embodiments, data is acquired from one or both ends of the fiber 28, and is processed as either single ended or dual ended data.

In one embodiment, the fiber 28 is a downhole fiber, by which temperature measurements are performed using the fiber 28 in a wellbore during and/or after wellbore drilling. In this embodiment, the DTS test configuration 20 may be incorporated in and/or with a wellbore.

The fiber 28 includes a plurality of sensing locations along the length of the fiber 28, which may be subject to various temperatures, e.g., by disposing one or more selected portions of the fiber 28 in one or more of the stability chambers 30, 32. DTS measurements may be taken at each of the plurality of sensing locations in a selected portion, and the viability of location dependent DTS measurement calibrations may be assessed. In the illustrated exemplary embodiments, the fiber 28 may be any fiber usable with DTS applications, including for example a Raman DTS fiber, which may be considered any optical fiber that can produce a sufficient level of Raman scattering intensity for the distributed temperature measurements. The core of the fiber 28 may be of any convenient size, e.g., 50 micron core, 62.5 micron core, 100 micron core, etc, among others. The fiber 28 may be any single mode or multimode fiber, and may be made from any suitable material, such as a doped quartz material. The fiber 28 may be an optical fiber having any refractive index and that is suitable for providing a sufficient level of Raman scattering intensity for the distributed temperature measurements.

At least one insulated stability chamber 30, 32 is provided at one or more selected locations along the length of the fiber 28. Each chamber 30, 32 may include an enclosure to enclose a selected portion of the fiber 28 and a suitable temperature controller to set the fiber 28 at a desired known temperature. Each chamber 30, 32 may be an isothermal oven, and may also include a respective spool 31, 33 disposed therein for supporting a selected length of the fiber 28.

The first stability chamber 30, in one embodiment, includes a first temperature controller and a first independent temperature measurement device, such as a thermocouple 34. The second stability chamber 32, in this embodiment, includes a second temperature controller and a second independent temperature measurement device, such as a thermocouple 36. The thermocouples 34 and 36 may be coupled in operable communication with the DTS unit 22, a separate processor and/or a suitable display.

In one embodiment, the fiber 28 may be broken up into two or more sections, or may otherwise include two or more optical fibers that are coupled together. For example, the fiber 28 may be broken up to simulate downhole temperature measurement configurations or other anticipated configurations where is it not possible or not practical to install a single length of fiber 28. The sections or fibers may be coupled via an external splice or connector. In this example, each section may have a separate stability chamber 30, 32 associated therewith. Although the illustrated embodiment shows two stability chambers 30, 32 and a single fiber 28, the DTS test configuration 20 may include any number of fibers, fiber sections and stability chambers.

With this exemplary test setup, the selected portion of the fiber 28 located in the insulated ovens 30, 32 can be exposed to selected temperatures. In one embodiment, the selected portion is cycled over a range of temperatures, i.e., subjected to a plurality of temperatures in a selected range. Integrating times can be set with the DTS unit 22 to obtain sets of data during stable temperature regions. Calibration of such data sets may then be performed to correct the temperature data according to location along the fiber 28. In the present method, each of the plurality of sensing locations (e.g., discrete points) along the length of the fiber 28 is considered unique, i.e., each sensing point is individually calibrated with its own set of unique calibration coefficients. This collection of calibrations may then be applied to the sets of data, and to subsequent sets of data, to accurately correct DTS data.

The present application contemplates single ended or dual ended DTS measurement calibrations. Also, while a single optical fiber is illustrated in the dual end DTS configuration of FIG. 2, other exemplary embodiments may utilize either single end configurations, or dual configurations, and further may use optical fibers that are disposed in a downhole portion of a geologic formation, i.e., downhole fibers.

Figure 3:
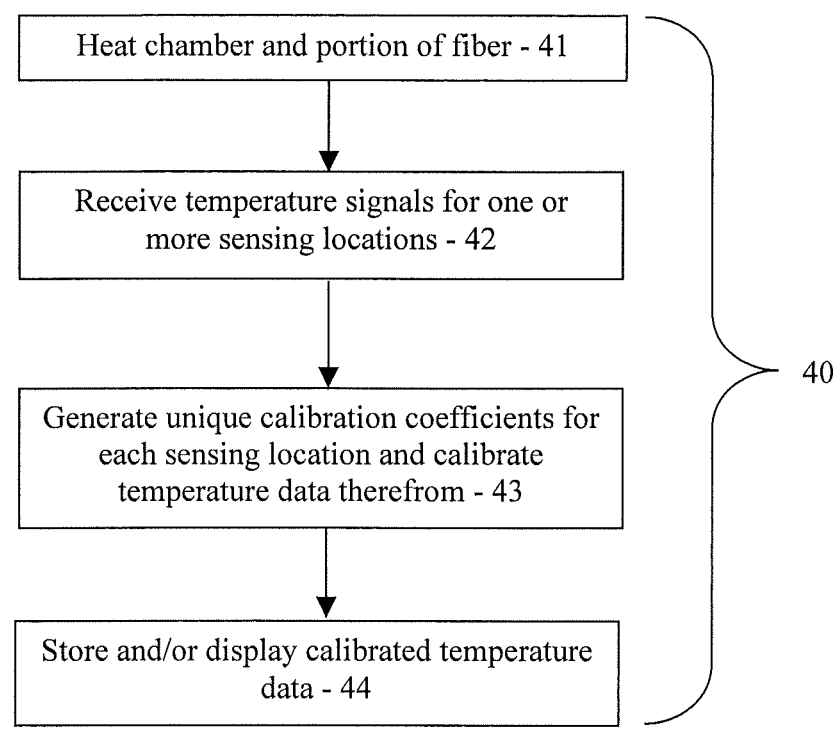
FIG. 3 is a flow chart providing an exemplary method for calibrating DTS data.

FIG. 3 illustrates a method 40 for calibrating temperature data, such as distributed temperature sensing (DTS) data. The method 40 includes one or more stages 41-44. The method 40 is described herein in conjunction with the DTS test configuration 20, and specifically in conjunction with the portion of fiber 28 disposed within the chamber 30, although the method 40 may be performed in conjunction with any number and configuration of fibers, chambers, sensing tools and measuring tools. In one embodiment, the method 40 includes the execution of all of the stages 41-44 in the order described. However, certain stages may be omitted, stages may be added, or the order of the stages changed. Furthermore, the method 40 may be performed in conjunction with wireline measurement processes, LWD or MWD processes, and any other suitable seismic measurement or other logging processes.

In the first stage 41, the chamber 30 is heated to a selected known temperature, which is measured and recorded via the thermocouple 34. A selected portion of the fiber 28 is disposed in the chamber 30 and is in turn heated to the selected temperature.

In the second stage 42, the DTS unit 22 emits suitable electromagnetic radiation into the fiber 28 and receives temperature signals associated with one or more sensing locations along the fiber 28. Each temperature signal is processed to generate a temperature value associated with each of the one or more sensing locations.

In one embodiment, the temperature signals include back-scattered laser radiation as a result of Raman scattering along the fiber 28. The DTS unit 22 receives these back-scattered radiation signals and processes them to determine associated temperature values. Each radiation signal and associated temperature value is associated with a sensing location. In one embodiment, the sensing location is determined by Optical Time Domain Reflectometry (OTDR), in which the sensing location is determined by determining a distance along the fiber 28 from the DTS unit 22 based on a time duration between generation of a laser pulse and receipt of the back-scattered signal by the DTS unit 22.

In another embodiment, stages 41 and/or 42 are repeated to generate a plurality of temperature values associated with each sensing location. The plurality of temperature values are generated for a plurality of different known temperatures. The temperature data, for a given sensing location, includes a separate temperature value associated with each known temperature.

In one example, the selected portion of the fiber 28 is subject to known temperatures ranging from 50 to 170 degrees Celsius, in steps of 15 degrees. At each known temperature, a temperature value is generated for each sensing location. Thus, in this example, the temperature data for each sensing location includes nine temperature values.

Note that each sensing location may be a single discrete point at which a single temperature measurement is taken, or may be a plurality of points along a selected length from which a plurality of temperature measurements may be taken and combined (e.g., averaged). As described herein, a "point" refers to a position in the fiber or a given length of the fiber from which a single temperature measurement is taken. In the present example, each sensing location is separated by a one meter increment, although other increments may be utilized.

In the third stage 43, temperature data received for each sensing location is calibrated. In one embodiment, calibration includes performing a data fit on the temperature data, and determining a set of coefficients from the data fit. Examples of data fitting include various regression methods, such as linear regression, linear and non-linear least squares fit, line and polynomial fit, segmented regression, hierarchal linear modeling, and others.

The coefficients, i.e., calibration coefficients, may then be applied to temperature data associated with the current sensing location. This method is repeated for each selected sensing location, so that an individual and independent set of calibration coefficients is generated for each sensing location.

In one exemplary embodiment, the data fit is a least squares fit. A number of parameters affecting the temperature reading is determined, and an appropriate polynomial equation is selected. The polynomial equation may take the form of:

$$T'=a_1T+a_2T^2+\ldots a_nT^n+a_{n+1},$$

where "T'" is the calibrated temperature, "$a_1$", "$a_2$", "$a_n$" and "$a_{n+1}$" are the calibration coefficients, and "T" is the measured temperature value from the DTS unit 22. Depending on the number of parameters, the polynomial may take any suitable form having a desired number of calibration coefficients. For example, the equation may be a linear equation (where n=1) of the form:

$$T'=a_1T+a_2,$$

the equation may be a quadratic equation (where n=2) of the form:

$$T'=a_1T+a_2T^2+a_3,$$

or the equation may be a cubic equation (where n=3) of the form:

$$T'=a_1T+a_2T^2+a_3T^3+a_4.$$

The equation may also take the form of higher order polynomials, where n is greater than 3.

Figure 4:
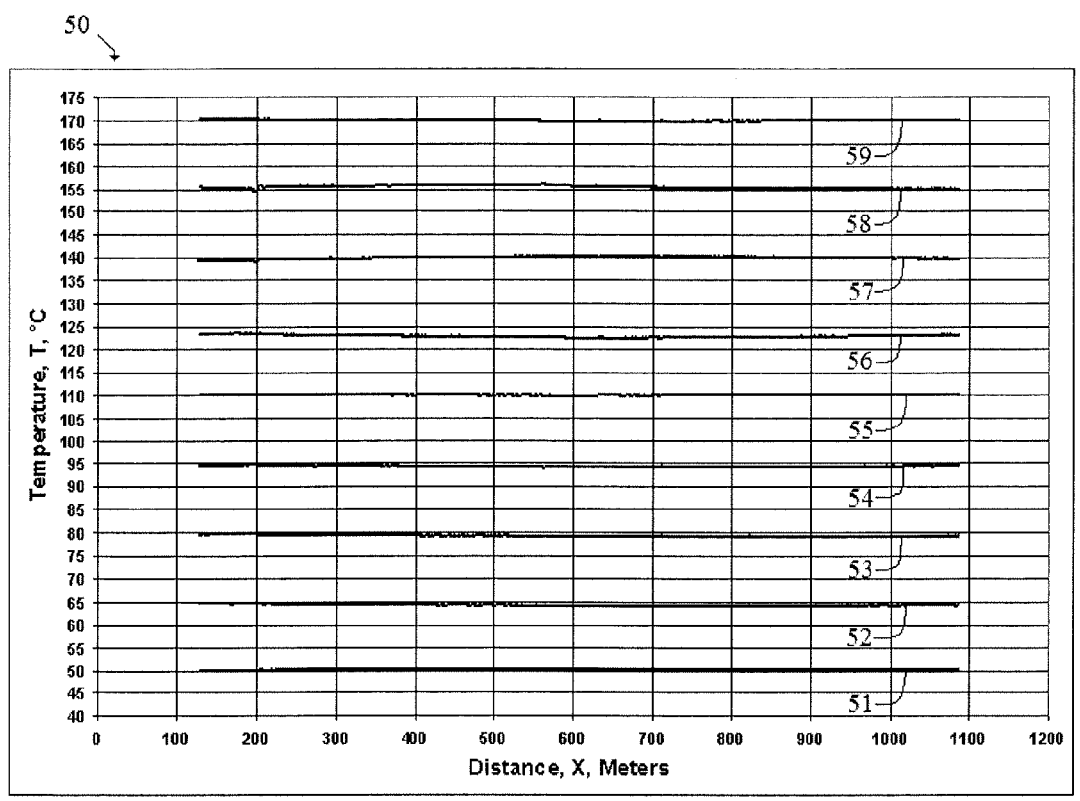
FIG. 4 is a graph of calibrated DTS data, using a method in accordance with the present disclosure, wherein calibration is performed for data of a DTS fiber arrangement at 15° Celsius increments.

In the fourth stage 44, the calibrated data for each sensing location is stored and/or displayed to a user via a suitable format, such as a graph as shown in FIG. 4. The calibrated data may be displayed by the DTS unit 22 or transmitted to another computer or processor for display.

EXAMPLE

Figure 2:
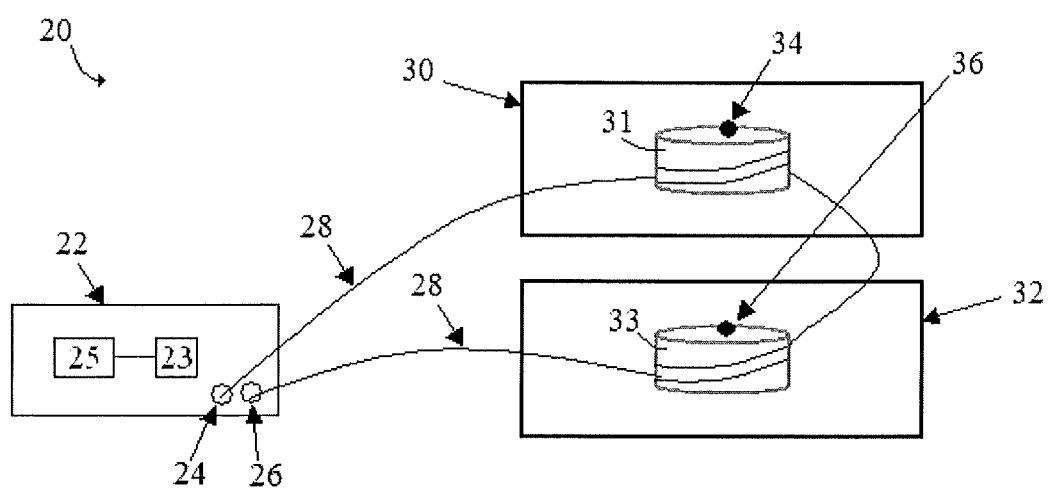
FIG. 2 is a plan view of an exemplary location dependent DTS test configuration.

Referring now to FIG. 4, exemplary test calibrations were performed using the exemplary test setup of FIG. 2. FIG. 4 shows a sample set of data ranging from 50 to 170 degrees Celsius in steps of 15 degrees. The specific temperature ranges and temperature steps are merely exemplary. The calibrations described herein may be performed over any selected temperature ranges and over any selected temperature steps.

In this example, a length of the fiber 28 equal to approximately 1000 meters was disposed in the chamber 30, and was heated to a plurality of known temperatures. For each known temperature, temperature values were taken from a plurality of sensing locations, e.g., 1000 sensing locations each located approximately one meter apart. Thus, for each known temperature, 1000 data points were recorded. Each data point was then calibrated according to the above method, i.e., a unique set of calibration coefficients were calculated for each location, and the corresponding temperature data was calibrated by applying that set of calibration coefficients to the corresponding temperature data. The resulting data sets are shown in FIG. 4.

In FIG. 4, a plurality of data sets are shown in a calibrated temperature display 50. Data sets 51-59 show the calibrated temperature data over the selected length (e.g., one kilometer) of the fiber 28 at known temperatures. For example, data set 51 shows calibrated temperature data for a fiber in a 50° Celsius (C.) environment, and data sets 52, 53, 54 and 55 show calibrated temperature data for a fiber in 65° C., 80° C., 95° C. and 110° C. environments, respectively. Likewise, data sets 56, 57, 58 and 59 show calibrated temperature data for a fiber in 125° C., 140° C., 155° C. and 170° C. environments, respectively. As is readily evident, the calibrated data sets shown in this example demonstrate that results generated by the present method are much more accurate than those of prior art calibration methods.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

It will be apparent to those skilled in the art that, while exemplary embodiments have been shown and described, various modifications and variations can be made to the location dependent DTS calibration method disclosed herein without departing from the spirit or scope of the invention. Accordingly, it is to be understood that the various embodiments have been described by way of illustration and not limitation.

What is claimed is:

1. A method for calibrating distributed temperature sensing (DTS) systems, comprising:
   disposing a length of an optical fiber having a plurality of sensing locations in a chamber;
   controlling, by a temperature controller, a temperature within the chamber to expose each of the plurality of sensing locations in the chamber to a first temperature;
   receiving temperature data associated with each of the plurality of locations along the length of an optical fiber for the first temperature;
   calculating a set of unique calibration coefficients specific to each of the plurality of locations in the chamber; and
   applying the set of calibration coefficients specific to each of the plurality of sensing locations along the fiber length to subsequent temperature data for calibrated correction thereof, the subsequent temperature data collected from measurements performed by disposing the optical fiber in an environment outside of the chamber.

2. The method of claim 1, further comprising exposing the plurality of sensing locations to at least a second temperature via the chamber and receiving additional temperature data associated with each of the plurality of locations for at least the second temperature.

3. The method of claim 1, wherein the coefficients are calculated using a data fit calculation.

4. The method of claim 3, wherein the data fit calculation is a polynomial fit calculation.

5. The method of claim 3, wherein the coefficients are calculated over a temperature range with specific temperature steps.

6. The method of claim 5, wherein the first temperature is a temperature selected to simulate anticipated temperature conditions in the environment.

7. The method of claim 1, wherein the optical fiber is a Raman DTS fiber.

8. The method of claim 1, wherein the temperature data is received from one or more downhole fibers.

9. The method of claim 1, wherein receiving temperature data includes emitting electromagnetic radiation into the optical fiber, receiving back-scattered radiation, and processing the back-scattered radiation to generate a temperature value.

10. A system for calibrating distributed temperature sensing (DTS) data, comprising:
   an optical fiber having a plurality of sensing locations along a fiber length;
   a chamber configured to enclose the plurality of sensing locations therein;
   a controller configured to control a temperature within the chamber to expose each of the plurality of sensing locations in the chamber to a first temperature;
   a DTS unit for receiving temperature data associated with each of the plurality of locations along the length of the optical fiber, the DTS unit including:
      a receiver for receiving temperature dependent signals and generating the temperature data therefrom; and
      a processor for calculating a set of unique calibration coefficients specific to each of the plurality of locations in the chamber, and applying the set of calibration coefficients specific to each of the plurality of locations in the chamber to subsequent temperature data for calibrated correction thereof, the subsequent temperature data collected from measurements performed by disposing the optical fiber in an environment outside of the chamber.

11. The system of claim 10, further comprising a controller configured to set the chamber and the fiber length to a known temperature.

12. The system of claim 10, further comprising a temperature measurement device disposed in the chamber and configured to measure temperature within the chamber independent of the sensing locations.

13. The system of claim 10, wherein the coefficients are calculated using a data fit calculation.

14. The system of claim 13, wherein the data fit calculation is a polynomial fit calculation.

15. The system of claim 13, wherein the coefficients are calculated over a temperature range with specific temperature steps.

16. The system of claim 15, wherein the first temperature is a temperature selected to simulate anticipated temperature conditions in the environment.

17. The system of claim 10, wherein the optical fiber is a Raman DTS fiber.

18. The system of claim 10, wherein the temperature data is received from one or more downhole fibers.

19. The system of claim 10, wherein receiving temperature data includes emitting electromagnetic radiation into the optical fiber, receiving back-scattered radiation, and processing the back-scattered radiation to generate a temperature value.

* * * * *